United States Patent Office 3,560,029
Patented Feb. 2, 1971

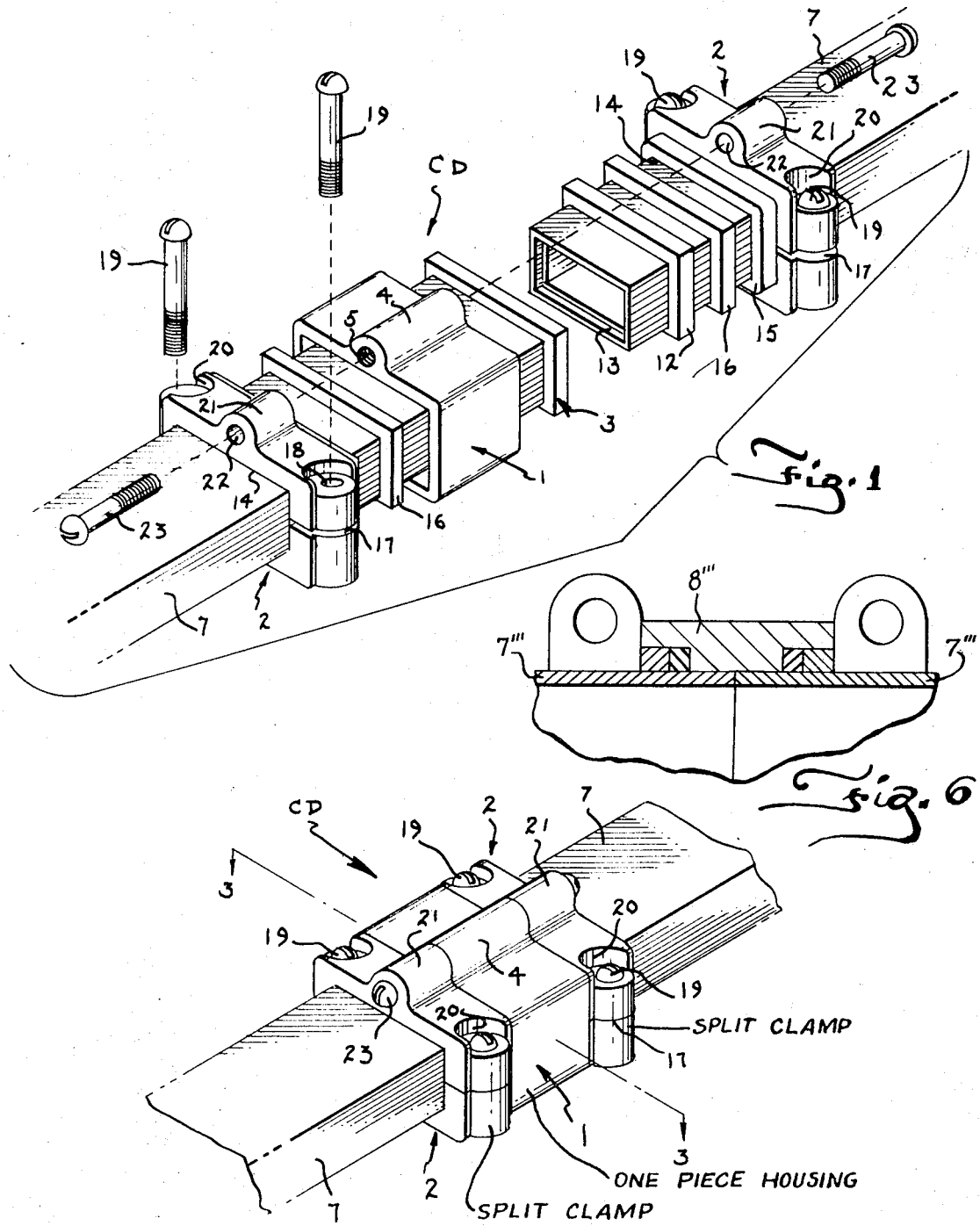

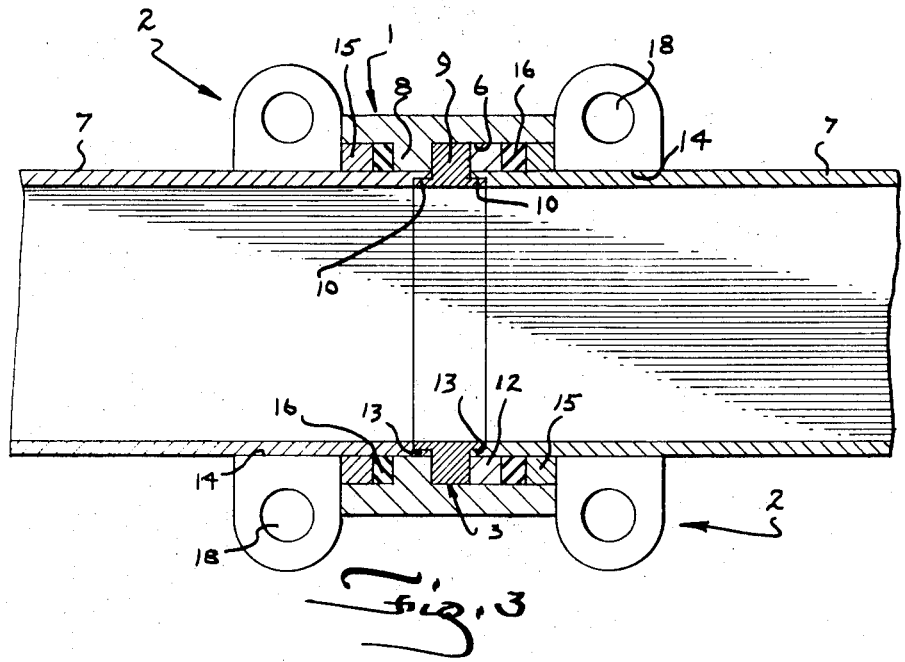
Fig. 3
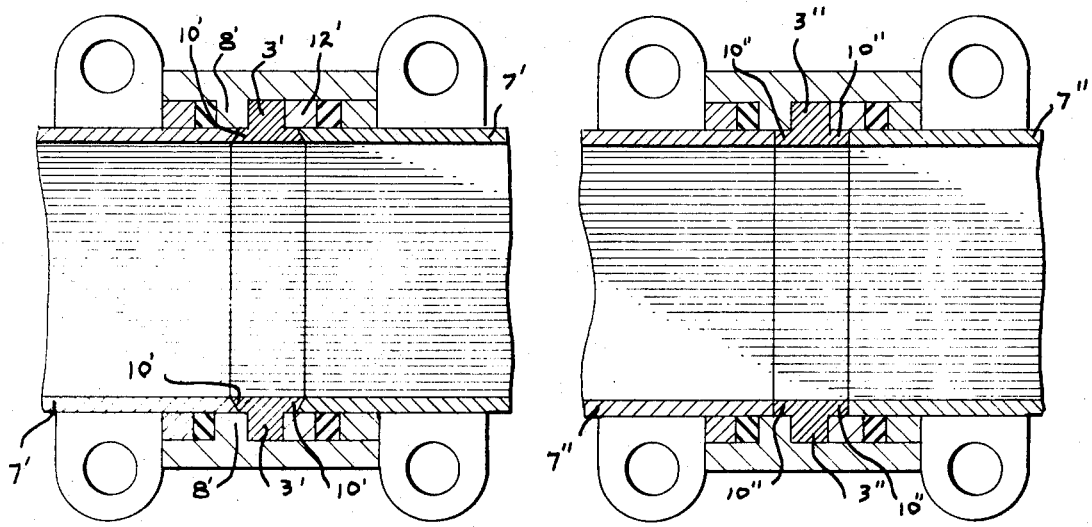
Fig. 4
Fig. 5

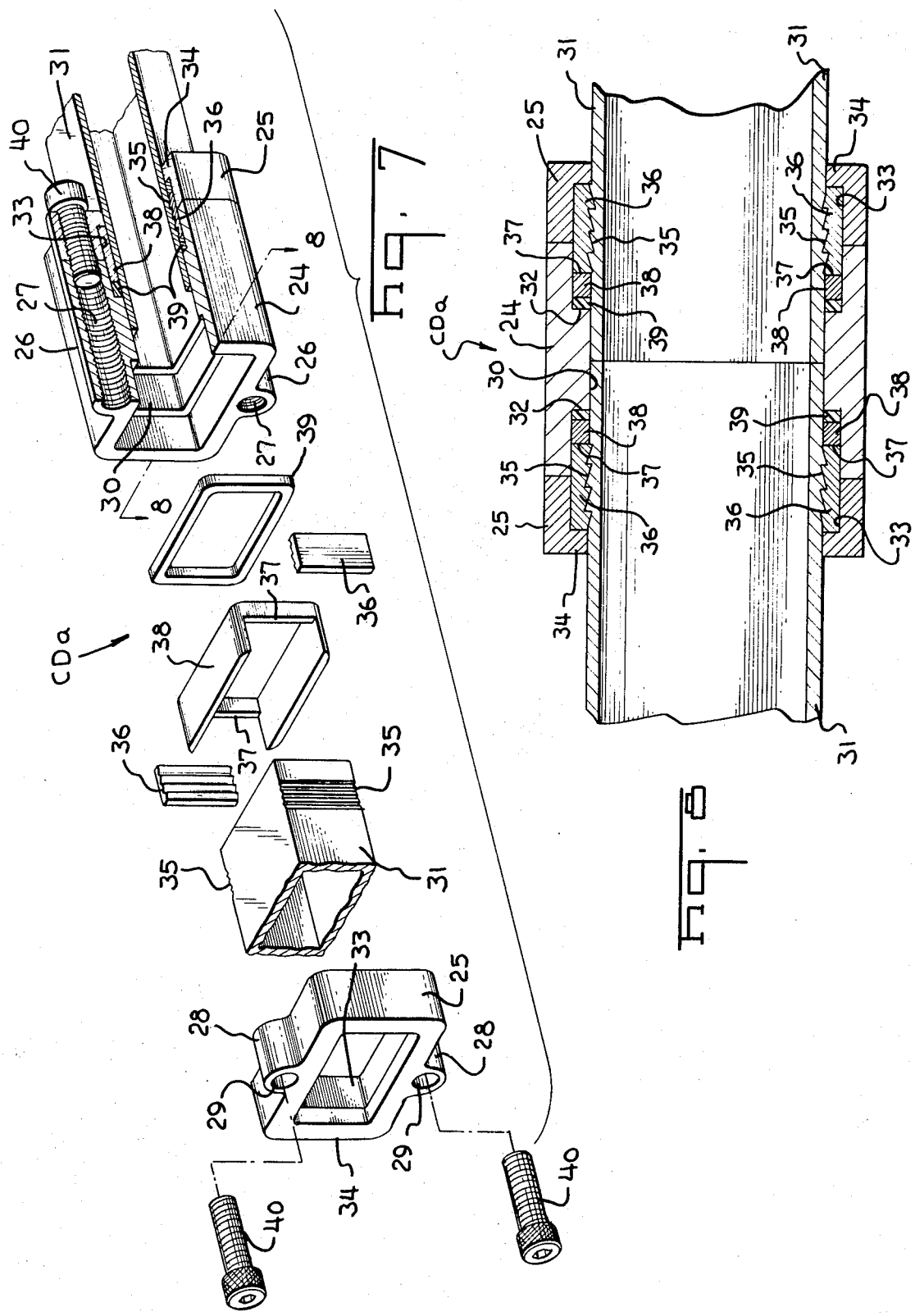

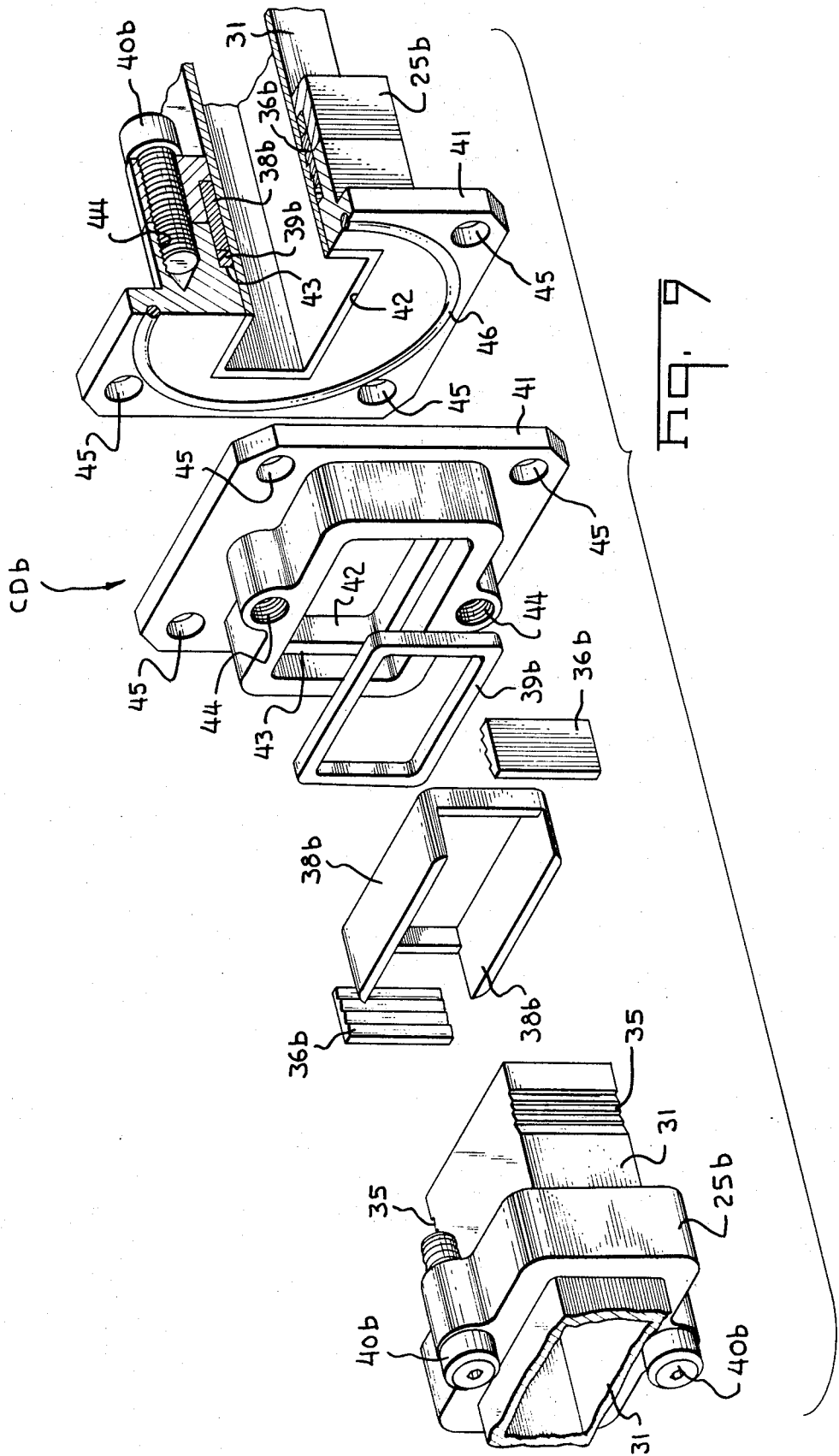

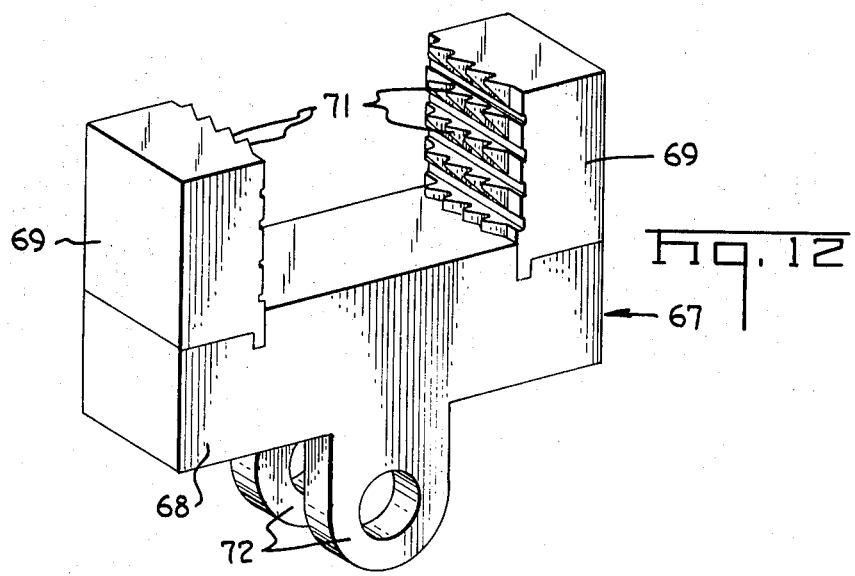
Fig. 12
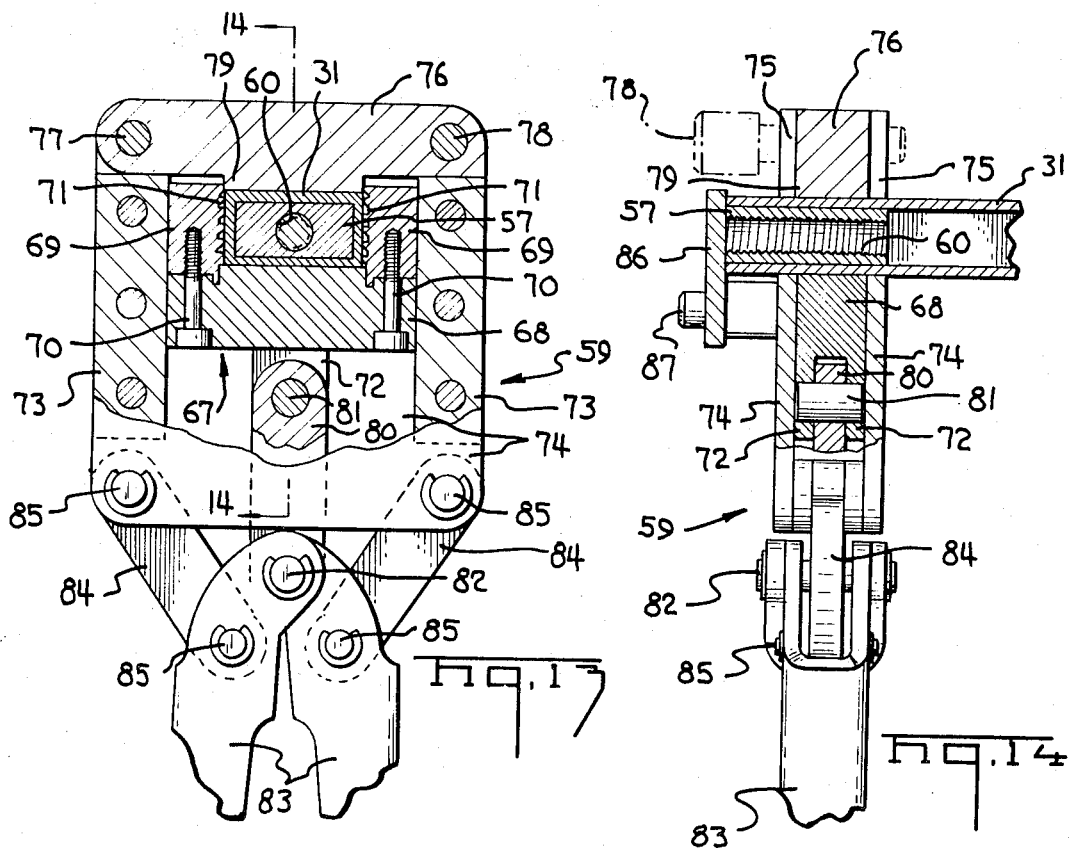
Fig. 13
Fig. 14

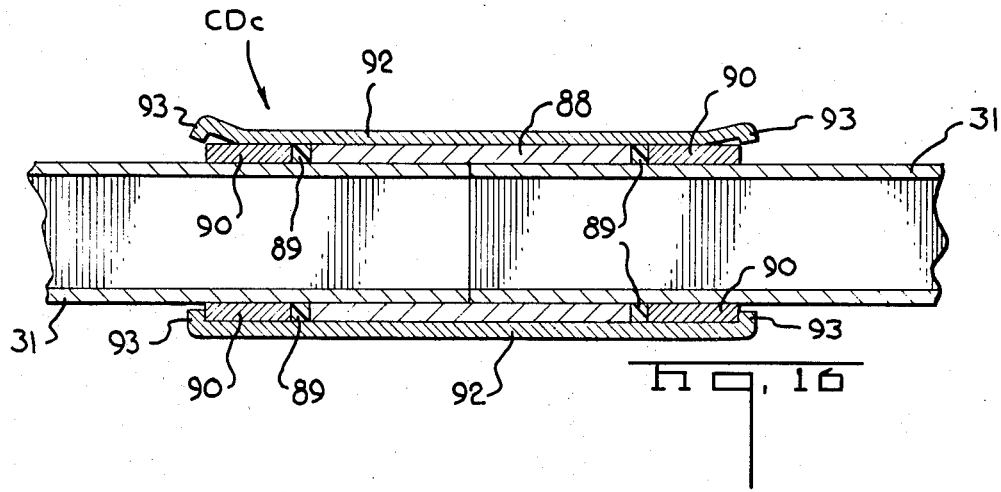
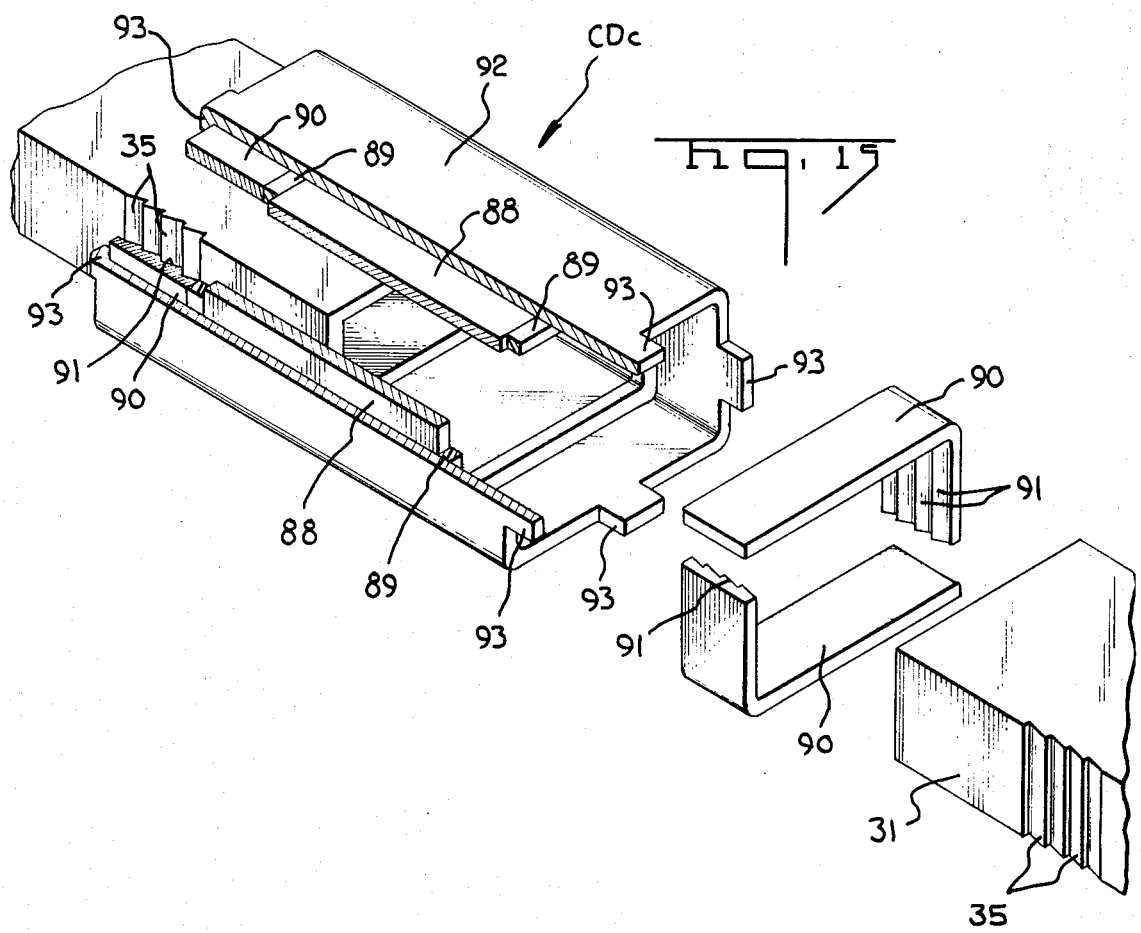

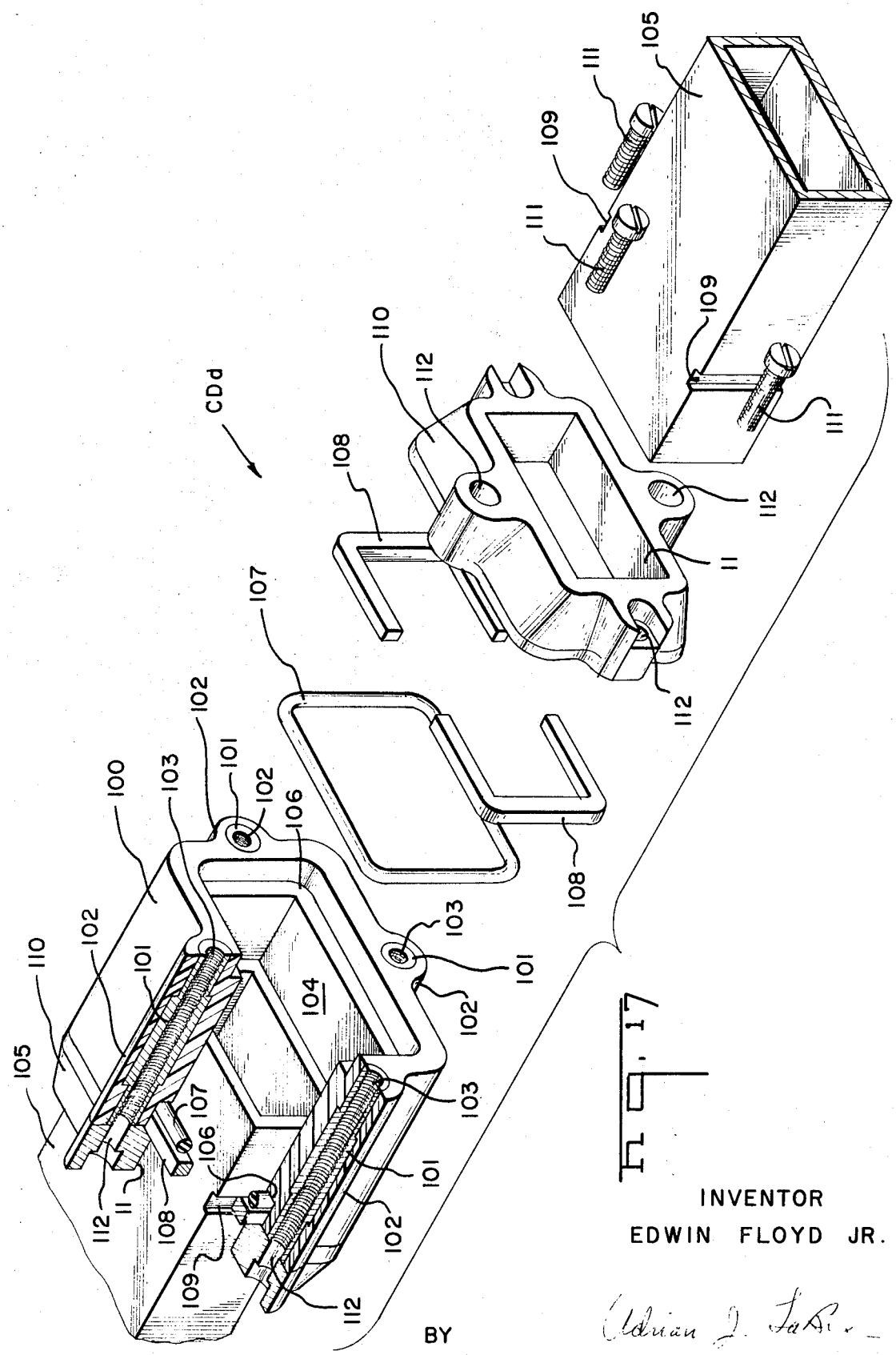

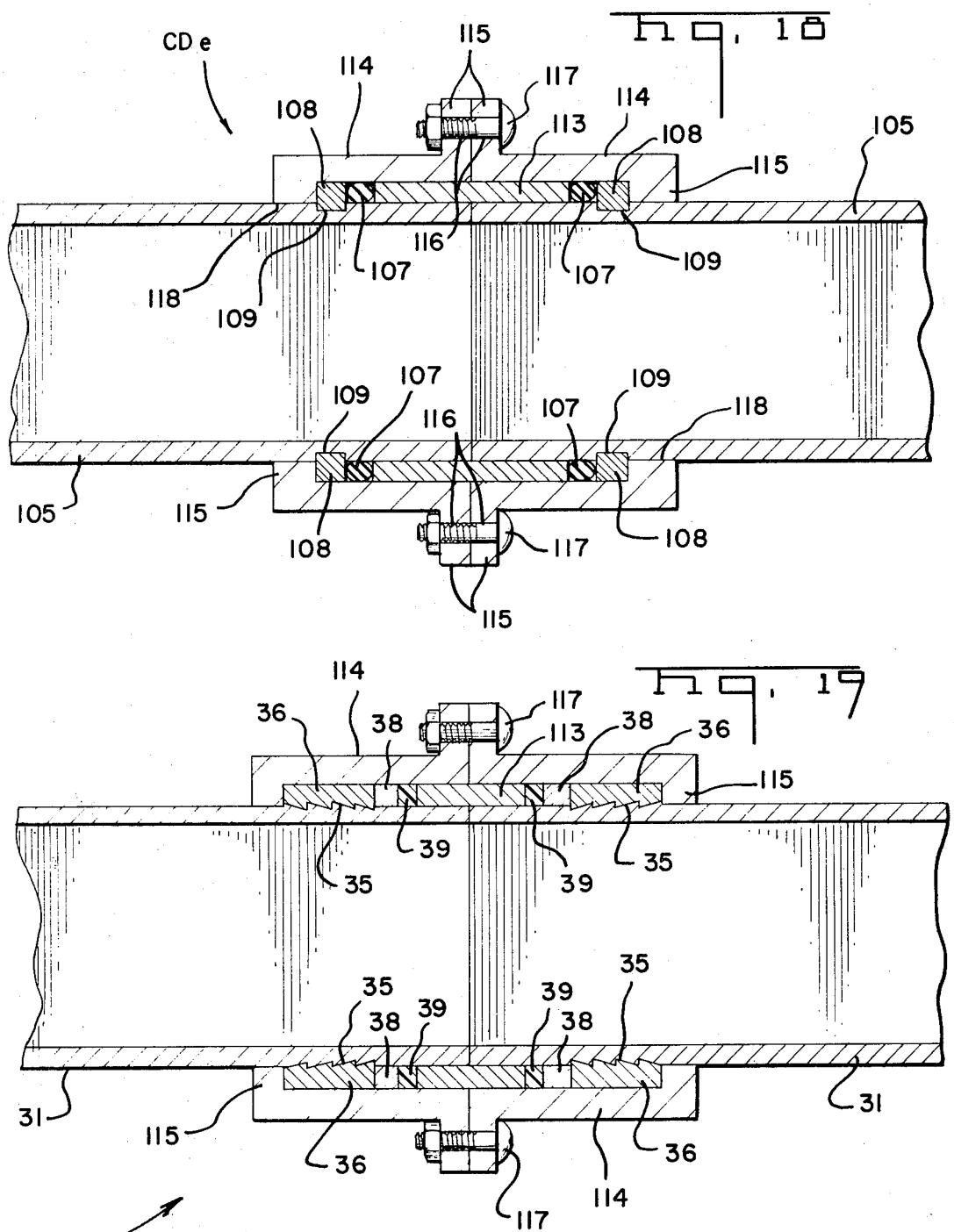

3,560,029
CONNECTION MEANS FOR WAVE GUIDE MEANS
Edwin Floyd, Jr., Harrisburg, Pa., assignor to
AMP Incorporated, Harrisburg, Pa.
Continuation-in-part of application Ser. No. 670,732,
Sept. 26, 1967, which is a continuation-in-part of application Ser. No. 631,841, Apr. 18, 1967, which in
turn is a continuation of application Ser. No. 468,793,
July 1, 1965. This application Sept. 22, 1969, Ser. No.
865,229
Int. Cl. F16l *19/02*
U.S. Cl. 285—369          7 Claims

ABSTRACT OF THE DISCLOSURE

A wave guide connector for connection onto an end of a wave guide comprises a body member having an opening extending therethrough with the opening having a configuration corresponding to the cross-sectional configuration of the wave guide. The end of the wave guide fits into the opening of the body member and is provided with serrated areas. Serrated inserts are disposed in the opening in engagement with the serrated areas and means is removably secured onto the body member and in engagement with the serrated inserts thereby securing the inserts and the end of the wave guide in the opening of the body member.

CROSS REFERENCE TO RELATED APPLICATIONS

This application is a continuation-in-part application of Ser. No. 670,732, filed Sept. 26, 1967, which is a continuation-in-part of Ser. No. 631,841, filed Apr. 18, 1967, which in turn is a continuation of Ser. No. 468,793, filed July 1, 1965, now abandoned.

This invention relates to connection means and more particularly to connection means for interconnecting the ends of tubular members, such as for example, wave guide means.

In order to apply a flange member to the end of a rectangular or circular wave guide, it is conventional practice to weld or solder a flange onto the ends of wave guide members. The heat generated to effect the welding, brazing or soldering of the flanges onto the wave guide members causes distortion of the inside dimensions of the wave guide members and plating has to be effected over the welded joints so that continuity is established. This is undesirable, because the inside dimensions of the wave guide are critical and the plating of the welded joints adds an additional step which is costly.

It is, therefore, a primary object of the present invention to provide connection means for wave guide means which obviates the above-mentioned disadvantages.

Another object of the invention is the provision of connection means that include clamping means that are removable from wave guide means.

A further object of the invention is to provide a connection device for wave guide members that is adjustable along the wave guide members.

An additional object of the invention is to provide a connection device for wave guide members including a housing member in which the ends of the wave guide members are aligned.

A still further object of the present invention is to provide connection means for wave guide means which are secured thereon without the aid of welding.

Still an additional object of the invention is to provide a connection device for wave guide members including a housing member in which the ends of the wave guide members are disposed and secured in aligned position therein.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

The foregoing objects are achieved in the present invention through the provision of a connection device construction including clamping members that are clampable onto wave guide members adjacent the ends thereof, a housing member having an opening extending therethrough which corresponds to the cross-sectional configuration of the wave guide members, an aligning means within the housing member against which the ends of the wave guide members engage to provide proper alignment between the ends of the wave guide members, and means are provided to secure the clamping members to the housing member so that the ends of the wave guide members are brought into engagement with the aligning member.

In the drawings:

FIG. 1 is a perspective exploded view of parts of a connection device for application to wave guide means;

FIG. 2 is a perspective view of the connection device on wave guide means interconnecting the wave guide means;

FIG. 3 is a cross-sectional view taken along lines 3—3 of FIG. 2;

FIG. 4 is a view similar to that of FIG. 3 but illustrating an alternative embodiment;

FIG. 5 is a view similar to that of FIG. 3 but showing a further embodiment of the invention;

FIG. 6 is a view similar to that of FIG. 3 but illustrating an additional embodiment;

FIG. 7 is a perspective view of a further embodiment with parts exploded and in cross section;

FIG. 8 is a view along lines 8—8 of the connection of FIG. 7;

FIG. 9 is a view similar to FIG. 7 of a still further embodiment;

FIG. 12 is a perspective view of a serrating device;

FIG. 13 is a top plan view partly in cross section of a tool using the serrating device of FIG. 12;

FIG. 14 is a view taken along lines 14—14 of FIG. 13;

FIG. 15 is a perspective view with parts exploded of a still additional embodiment;

FIG. 16 is a longitudinal cross-sectional view of the connection of FIG. 15;

FIG. 17 is a perspective view with parts exploded and in cross section of a still another embodiment;

FIG. 18 is a longitudinal cross-sectional view of the embodiment of FIG. 17 but with a two-piece housing; and FIG. 19 is a longitudinal cross-sectional view of the embodiment of FIGS. 7 and 8 but with a two-piece housing.

Figure 10:
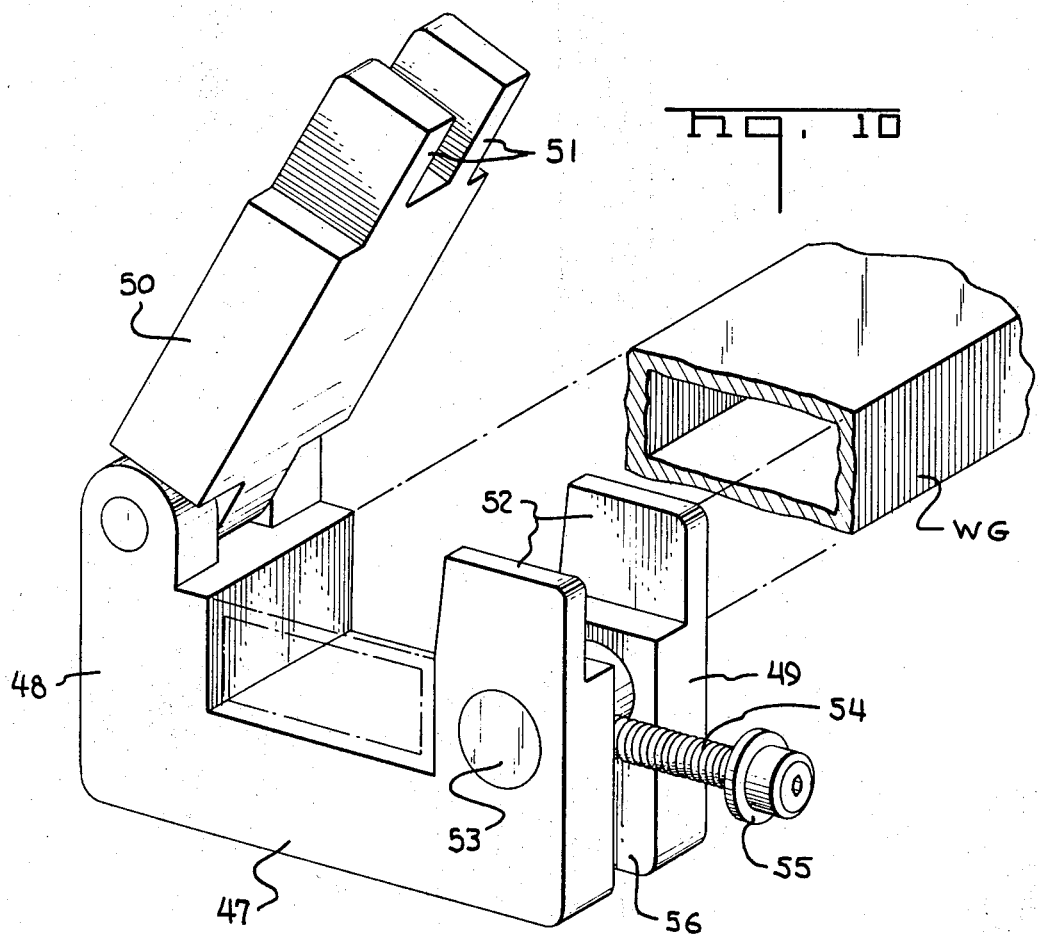
FIG. 10 is a perspective view of a device for dressing an end of a wave guide.
Figure 11:
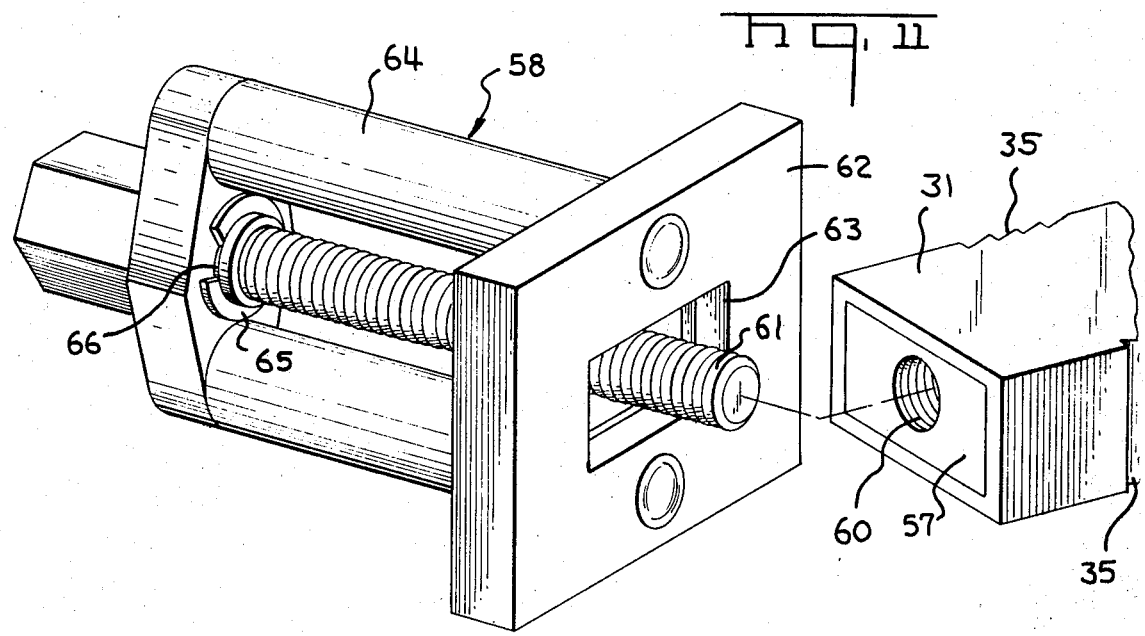
FIG. 11 is an exploded perspective view of mandrel for a wave guide and a mandrel-inserting and removing device.

Turning now to the drawings and more particularly FIGS. 1 through 3, there is illustrated a connection device CD including a housing member 1, clamping members 2 and an aligning member 3. Housing member 1 has a generally rectangular configuration and includes arcuate shaped projections 4 extending outwardly from the top and bottom surfaces. A threaded hole 5 extends through each of projections 4. An opening 6 extends through housing member 1 and has a configuration corresponding to that of the cross-sectional configuration of wave guide members 7. As can be descerned, the wave guide members have a rectangular configuration, but they can assume any configuration that is known in the field of wave guides.

A flange 8 extends outwardly from the surface of opening 6 and the dimensions of flange 8 are such that flange 8 is only slightly larger than the exterior dimensions of the wave guide members. Aligning member 3 is placed in housing member 1 and includes a section 9 that engages a surface of flange 8 as illustrated in FIG. 3. Flange sections 10 extend outwardly from section 9 and the inner surface of section 9 and flange sections 10 delimit an opening 11 which has a configuration corresponding to that of the interior configuration of wave guide members 7. A retaining ring 12 having a configuration corresponding to that of flange 8 is pressed within opening 6 of housing member 1 and against section 9 so as to retain aligning member 3 within housing member 1 and secured between flange 8 and retaining ring 12. As can be discerned from FIG. 3, flange sections 10 are spaced outwardly from flange 8 and retaining ring 12 in order to form stepped sections that mate with stepped portions 13 which are formed in the ends of wave guide members 7.

Each of clamping members 2 is similar to the clamping members disclosed in U.S. patent application Ser. No. 429,722, filed Feb. 2, 1965 and assigned to the present assignee. Each of clamping members 2 has an opening 14 extending therethrough which conforms to the configuration of wave guide members 7. A flange 15 is located on clamping members 2 and is adapted to be disposed within opening 6 against respective gaskets 16, as illustrated in FIG. 3. A slot 17 is disposed in each side of clamping members 2, and a hole 18 is located also in each side of the clamping member. Holes 18, below slot 17, are threaded in order to receive screws 19 so that when clamping members 2 are placed onto wave guide members 7, they can be clamped tightly in place thereon by screwing screws 19 into the threaded sections of holes 18 thereby decreasing the width of slot 17. Recesses 20 are disposed adjacent the entrance to holes 18 in order to receive the heads of screws 19.

Projections 21 extend outwardly from the top and bottom surfaces of clamping members 2, and they preferably have the same configuration as projections 4 on housing member 1. A hole 22 is disposed in each of projections 21 and is in alignment with the respective threaded hole 5 of projections 4 so that screw members 23 extend through holes 22 and threadably engage threaded holes 5 in order to secure clamping members 2 onto housing member 1 and to cause flanges 15 to abut against gasket 16 in a sealing manner.

In assembly, clamping members 2 with screws 19 in a loose position, are placed on wave guide members 7, gaskets 16 are then placed on the wave guide members and the ends of the wave guide members are inserted into opening 6 of housing member 1 so that stepped portions 13 thereof mate with flange sections 10 of aligning member 3, as illustrated in FIG. 3. Screw members 23 are then inserted into holes 22 of projections 21 and the screw members are then threadably engaged in threaded holes 5 of projections 4, but screw members 23 are not moved to a tightened position, the screw members are moved to a near tight position. Screws 19 are tightened in holes 18 so that clamping members 2 are tightly clamped onto respective wave guide members 7. Screw members 23 are then tightened in holes 5 thereby causing stepped portions 13 to snugly engage flange sections 10 and flanges 15 to push gaskets 16 into sealing engagement with flange 8 and retaining ring 12 to form a sealed joint in joining the ends of wave guide members 7. Flange sections 10 in engagement with stepped portions 13 of wave guide members 7 cause the ends of the wave guide members to be forced against flange 8 and retaining ring 12 thereby properly aligning the ends of the wave guide members so as to effect proper operation of the wave guide members.

Flange sections 10' of aligning member 3' in the embodiment of FIG. 4 has beveled ends which mate with beveled ends of wave guide members 7' in order to properly align the ends of the wave guide members and to force the ends thereof against flange 8' and retaining ring 12'. Flange sections 10" of aligning member 3" in the embodiment of FIG. 5 has straight edges against which straight edges of the ends of wave guide members 7" engage in order to properly align the ends of the wave guide members. The ends of the flange sections of aligning member 3 as well as the ends of wave guide members 7 can take any mateable configurations that are desirable in order to properly align the ends of the wave guide members. As can be discerned, the aligning members are disposed in the center of the housing member so that equal parts of the ends of the wave guide members are disposed within the housing member. If desired, the aligning member may be eliminated and flange 8 can be continuous to include section 3 and retaining ring 12, as illustrated in FIG. 6, and with this arrangement, the ends of the wave guide members abut against each other instead of against flange sections of an aligning member.

FIGS. 7 and 8 illustrate a further embodiment of the invention. The connection device CDa of this embodiment includes a housing 24 similar to that illustrated in FIG. 6 and clamps 25. Housing 24 has projections 26 provided with threaded holes 27 and clamps 25 are provided with projections 28 and holes 29 which mate with projections 26 and threaded holes 27 of housing 24. Housing 24 is provided with an opening 30 having a configuration conforming to that of wave guides 31 and in which the ends of the wave guides are disposed in abutting relationship as illustrated in FIG. 8. Opening 30 is provided with stepped sections 32 and clamps 25 are provided with openings 33 which have shoulders 34 through which wave guides 31 pass. Serrations 35 are disposed in the sides of wave guides 31 at spaced locations inwardly from the ends thereof and these serrations are mateable with serrated inserts 36 which are disposed in recesses 37 of a locating member 38.

In assembly, clamps 25, locating members 38 and gaskets 39 are disposed on respective wave guides 31. Inserts 36 are mated with serrations 35 of one of the wave guides and this wave guide is then inserted in position in housing 24 so that locating member 38 pushes gasket 39 against stepped section 32 and clamp 25 is secured on housing 24 via screws 40 thereby securing one of wave guides 31 in position in housing 24. The same steps are followed to secure the over wave guide in position in housing 24 thereby effecting a butt connection between the ends of wave guides such that the ends of the wave guides are in abutting relationship thereby providing a continuously smooth inner surface along the wave guides. Locating members 38 are held in position via clamps 25 and inserts 36 in recesses 37 of locating members 38 in mateable engagement with serrations 35 of the wave guides prevent the wave guides from being pulled out of housing 24 and withstand an axial load to maintain the ends of the wave guides in abutment.

FIG. 9 illustrates a connection device CDb which is a still further embodiment of the connection device which is similar to connection device CDa except that the ends of wave guide 31 are secured in flanges 41 having openings 42 extending therethrough which correspond to the cross-sectional configuration of wave guides 31 and in which the ends thereof are disposed. Openings 42 are provided with stepped sections 43 against which gaskets 39b engage and are held thereagainst by locating members 38b and serrated inserts 36b in engagement with serrations 35 of wave guides 31 in conjunction with clamps 25b and screws 40b which mate with the threaded holes 44 in flanges 41. Inserts 36b in mateable engagement with serrations 35 of wave guides 31 assure that the ends of the wave guides are in the same planes with the abutting surfaces of flanges 41 which are held in engagement by means of bolts or screws (not shown) within holes 45. When flanges 41 are secured together with the ends of wave guides 31 secured therein, the wave guides are maintained in alignment to effect an excellent connection between the wave guides and gasket 46 in a surface of one of flanges 41 assures a moisture free connection.

FIG. 10 illustrates a device for dressing an end of a wave guide. This device includes a base 47 having legs 48 and 49 extending outwardly therefrom and in which a wave guide WG is disposed. A locking member 50 has one end pivotally mounted to leg 48 the other end is provided with spaced projections 51 which are disposed between extensions 52 extending outwardly from leg 49. Pivot 53 is pivotally mounted in leg 49 and has a screw 54 threadably disposed therein and the washer 55 is provided on screw 54. A slot 56 is disposed in base 47 and leg 49 to permit receipt of screw 54 therein.

In operation, wave guide WG is placed in the space provided by base 47 and legs 48, 49. Locking member 50 is then moved into position so that projections 51 rest between extensions 52 and on top of leg 49 whereupon the slot 56 is in communication with the slot between projections 51. Screw 54 is pivotally moved thereinto and tightened causing washer 55 to engage projections 51 thereby securing the wave guide in position. The wave guide once it is secured in the device can then be cut and the end filed and smoothed to provide a trued end for the wave guide or a cut end of a wave guide can be trued by this device since trued ends of wave guides are essential when placed in abutting relationship in the connection devices of the present invention.

FIGS. 11 through 14 illustrate a mandrel 57 for disposition within wave guide 31 during the formation of serrations 35 along the sides of the wave guide, a device 58 for inserting and removing mandrel 57 from the wave guide, a serrating member 67 and a tool 59 in which serrating member 67 is disposed for applying serrations 35 to the sides of the wave guides.

Mandrel 57 has a threaded hole 60 disposed therein for engagement with a screw 61 of device 58 in order to insert mandrel 57 into and remove the same from the end of the wave guide on which serrations 35 are to be formed.

Device 58 includes a plate 62 having an opening 63 therein through which screw 61 extends and mandrel 57 passes. A U-shaped member 64 is mounted on plate 62 and carries screw 61 so that it can be rotatable relative thereto when engaged by a wrench. Screw 61 is held in position in member 64 via a split washer 65 disposed in a groove 66 in the screw. Device 58 is necessary to insert and remove mandrel 57 from the end of a wave guide because of the snug fit of mandrel 57 therein so as to support the wave guide and prevent any distortion thereto upon serrations 35 being informed in the sides thereof.

FIG. 12 illustrates a serrating member 67 which is provided with a base 68 and serrating elements 69 secured to base 68 via screws 70. Serrating elements 69 are provided with serrating teeth 71 and base 68 includes projections 72 extending outwardly therefrom.

Serrating member 67 is movably positioned between sides 63 and plates 74 of tool 59. Each of plates 74 is provided with a recess 75 in which wave guide 31 is positioned and held therein by a locking member 76 which has one end pivotally connected to one of sides 73 via pivot pin 77 while a pull pin 78 is used at the other end of locking member 76 and sides 73 to maintain the locking member in a locked position so that projection 79 of locking member 76 maintains wave guide 31 bottomed in the recesses 75 of plates 74 as illustrated in FIGS. 13 and 14. A link 80 has one end pivotally connected between projections 72 of base 68 of serrating member 67 via pin 81 while the other end of link 80 is connected to pivot pin 82 which pivotally connects handle members 83 together. Links 84 are pivotally connected between plates 74 and handle members 83 via pins 85. A guide 86 is secured to one of plates 74 via securing means 87 to position guide 86 relative to recesses 75 so that wave guide 31 can be properly positioned in tool 59 when serrating member 67 is operated via handles 83 and links 80, 84 to form serrations 35 at properly spaced positions in the sides of wave guides 31.

Connection device CDc is still an additional embodiment of the present invention which is illustrated in FIGS. 15 and 16. This connection device is used to provide a butt splice between wave guides 31 and includes an alignment sleeve 88 in which the ends of wave guides 31 are disposed in abutting relationship. Gaskets 89 are located at the ends of sleeve 88 between sleeve 88 and L-shaped holding members 90 which are provided with serrated surfaces 91 on the short legs thereof; serrated surfaces 91 mate with respective serrations 35 of wave guide 31. A jacket 92 surrounds sleeve 88, gaskets 89 and holding members 90 and is provided with four tabs 93 at each end thereof which are bent into engagement with holding members 90 so as to secure wave guides 31 in abutting relationship within sleeve 88.

The same type of connection as illustrated in FIGS. 15 and 16 could be applied with respect to a connection of the type illustrated in FIG. 9 so as to provide a connection for the ends of wave guides via flange members.

Connection device CDd, as illustrated in FIG. 17, has a housing 100 made of plastic and in which metal inserts 101 are molded in place to provide projections 102. Inserts 101 have threaded openings 103 therein. Opening 104 extends through housing 100 and it has a cross-sectional configuration conforming to that of wave guide members 105 so that they can be received in abutting relationship therein. Shoulders 106 are located within each end of opening 104 to receive gaskets 107 thereagainst.

U-shaped retaining members 108 are received in opening 104 for engagement with gaskets 107 and the bights thereof are mateable with grooves 109 which have been formed in the sides of wave guide members 105. The legs of retaining members 108 extend along the top and bottom surfaces of the wave guide members so as to apply pressure on the gaskets 107. Grooves 109 are formed in the sides of the wave guide members at proper distances from the abutting ends of the wave guide members so that clamp members 110 can clamp the ends of the wave guide members in proper abutting engagement within housing 100 without any undue strain thereon by being secured on housing 100 via screws 111 which extend through holes 112 in clamp member 110 to threadably engage threaded holes 102 of inserts 101 thereby applying pressure on retaining members 108 and gaskets 107 to provide a sealed connection to prevent corrosion. Clamp members 110, of course, have openings 111 extending therethrough and these openings correspond in cross-sectional configuration to that of the wave guide members.

FIG. 18 illustrates connection device CDe which is an embodiment of FIG. 17 wherein sleeve 113 is a housing surrounded by identical parts 114 each having projections 115. Holes 116 extend through projections 115 so that bolts 117 can be positioned therein to secure parts 114 together with inwardly-directed sections 115 engaging U-shaped retaining members 108 having bights thereof disposed in grooves 109 of wave guide members 105 thereby forcing gaskets 107 against the ends of housing 113 and the ends of wave guide members 105 in abutting engagement. Inwardly-directed sections 115 delimit openings 118 through which wave guide members 105 pass.

FIG. 19 illustrates connection device CDf which is an embodiment of FIGS. 7 and 8. Connection device CDf includes sleeve 113 and identical parts 114 as in FIG. 17 and they operate in the same manner so that when bolts 117 are tightened, inwardly-directed sections 115 apply axial pressure onto serrated inserts 36 and locating members 38 causing the serrated surfaces of inserts 36 in mateable engagement with serrations 35 to move the ends of the wave guide members 31 into abutting engagement within sleeve 113 and the inner ends of locating members 38 force gaskets 39 against the ends of sleeve 113.

Thus, there has been disclosed unique connection devices showing the ends of wave guide members together in a properly aligned manner and the connection devices are readily applied to the ends of wave guide members to interconnect them together.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. A coupling device to couple ends of wave guide members together with the ends of the wave guide members having serrated areas, said coupling device comprising a housing member having an opening extending therethrough, said opening having a configuration corresponding to a cross-sectional configuration of the wave guide members so that the ends of the wave guide members can be disposed adjacent and in alignment with each other within said opening thereby providing a continuous inner surface between the wave guide members, locating means for disposition along at least a portion of said housing member and along the serrated areas of the wave guide members, said locating means having insert-receiving areas in alignment with the serrated areas of the wave guide members, insert means for disposition within said insert-receiving areas and having serrated surfaces for mateable engagement with the serrated areas of the wave guide members, and securing means for engagement with said insert means to secure said insert means in position within said locating means with said serrated surfaces of said insert means in engagement with the serrated areas of the wave guide members thereby to apply axial forces on the wave guide members to secure the ends of the wave guide members in abutting engagement and in alignment within said opening without any distortion thereto.

2. In a coupling device for coupling ends of wave guide members together with the ends of the wave guide members having indentation means spaced inwardly from the ends, said coupling device comprising a housing member having an opening extending therethrough, said opening having a configuration corresponding to a cross-sectional configuration of the wave guide members so that the ends of the wave guide members can be disposed adjacent and in alignment with each other within said opening thereby providing a continuous inner surface between the wave guide members, locating means disposed along at least a portion of said housing member and along said indentation means, said locating means having retaining-receiving areas in alignment with said indentation means, retaining means disposed within said retaining-receiving areas and having section means in engagement with said indentation means, and securing means engaging said retaining means thereby securing said retaining means in position within said locating means with said section means in engagement with said indentation means thereby applying axial forces on the wave guide members and securing the ends of the wave guide members in abutting engagement and in alignment within said opening without any distortion thereto.

3. A coupling device to couple ends of wave guide members together with the ends of the wave guide members having serrated areas, said coupling device comprising a housing member having an opening extending therethrough, said opening having a configuration corresponding to a cross-sectional configuration of the wave guide members so that the ends of the wave guide members can be disposed adjacent and in alignment with each other within said opening thereby providing a continuous inner surface between the wave guide members, locating means for disposition in and along at least a portion of said housing member and along the serrated areas of the wave guide members, said locating means having insert-receiving areas in alignment with the serrated areas of the wave guide members, insert means for disposition within said insert-receiving areas and having serrated surfaces for mateable engagement with the serrated areas of the wave guide members, and securing means for engagement with said insert means to secure said insert means and said locating means in position within said housing member with said serrated surfaces of said insert means in engagement with the serrated areas of the wave guide members thereby to apply axial forces on the wave guide members to secure the ends of the wave guide members in abutting engagement and in alignment within said opening without any distortion thereto.

4. A coupling device to couple ends of wave guide members together with the ends of the wave guide members having serrated areas, said coupling device comprising a housing member having an opening extending therethrough, said opening having a configuration corresponding to a cross-sectional configuration of the wave guide members so that the ends of the wave guide members can be disposed adjacent and in alignment with each other within said opening thereby providing a continuous inner surface between the wave guide members, locating means disposed exteriorly along said housing member and having sections extending beyond both ends of said housing member along the serrated areas of the wave guide members, said sections defining holding member-receiving areas in alignment with the serrated areas of the wave guide members, holding-member means for disposition within said sections and having serrated surfaces for mateable engagement with the serrated areas of the wave guide members, and securing means provided by said locating means for engagement with said holding-member means to secure said holding-member means in position in said sections with said serrated surfaces in engagement with the serrated areas of the wave guide members thereby to apply axial forces on the wave guide members to secure the ends of the wave guide members in abutting engagement and in alignment within said opening without any distortion thereto.

5. A connection device for an end of a wave guide member having serrated areas disposed adjacent an end thereof, said connection device comprising a flanged housing member having an opening extending therethrough, said opening having a configuration corresponding to the cross-sectional configuration of the wave guide member, locating means for disposition within said housing member and along the serrated areas of the wave guide member, said locating means having insert-receiving areas in alignment with the serrated areas of the wave guide member, insert means for disposition within said insert-receiving areas and having serrated surfaces for mateable engagement with the serrated areas of the wave guide member, and securing means for engagement with said insert means to secure said insert means in position within said locating means with said serrated surfaces of said insert means in engagement with the serrated areas of the wave guide member thereby to apply axial forces on the wave guide member to secure the end of the wave guide member in said opening without any distortion thereto.

6. In a coupling device for coupling ends of wave guide members together with the ends of the wave guide members having indentation means spaced inwardly from the ends, said coupling device comprising a housing member having an opening extending therethrough, said opening having a configuration corresponding to a cross-sectional configuration of the wave guide members so that the ends of the wave guide members can be disposed adjacent and in alignment with each other within said opening thereby providing a continuous inner surface between the wave guide members, clamping means for disposition along said housing member and along said indentation means, said clamping means having retaining-receiving areas in alignment with said indentation means, retaining means for disposition within said retaining-receiving areas and having section means for engagement with said indentation means, means provided on said clamping means for engaging said retaining means thereby securing said retaining means in position within said retaining-receiving areas with said section means in engagement with said indentation means thereby applying axial forces on the wave guide members and securing the ends of the wave guide members in abutting engagement and in alignment within said opening without any distortion thereto, and connecting means for connecting said clamping means together thereby securing said clamping means in position over said housing member and along sections of the wave guide members.

7. A coupling device to couple ends of wave guide members together with the ends of the wave guide members having indentation means spaced inwardly from the ends, said coupling device comprising a housing member having an opening extending therethrough, said opening having a configuration corresponding to a cross-sectional configuration of the wave guide members so that the ends of the wave guide members can be disposed adjacent and in alignment with each other within said opening thereby providing a continuous inner surface between the wave guide members, clamping means for disposition exteriorly along said housing member and having sections extending beyond both ends of said housing member and along the indentation means of the wave guide members, said sections defining holding member-receiving areas in alignment with the indentation means of the wave guide members, holding-member means for disposition within said sections and having section means for mateable engagement with the indentation means of the wave guide members, means provided by said clamping means for engagement with said holding-member means to secure said holding-member means in position in said sections with said section means in engagement with the indentation means of the wave guide members thereby to apply axial forces on the wave guide members to secure the ends of the wave guide members in abutting engagement and in alignment within said opening without any distortion thereto, and securing means for securing said clamping means over said housing member and along sections of the wave guide member.

References Cited
UNITED STATES PATENTS

| 1,183,204 | 5/1916 | Johnson | 287—52.09 |
| 2,989,326 | 6/1961 | Seward et al. | 287—52.09 |
| 3,365,681 | 1/1968 | Floyd | 333—98 |

DAVID J. WILLIAMOWSKY, Primary Examiner

W. L. SHEDD, Assistant Examiner

U.S. Cl. X.R.

333—98; 285—417